(12) United States Patent
Yuan et al.

(10) Patent No.: US 9,606,578 B2
(45) Date of Patent: Mar. 28, 2017

(54) CONNECTOR AND AN ELECTRONIC DEVICE HAVING THE SAME

(71) Applicant: Lenovo (Beijing) Co., Ltd., Beijing (CN)

(72) Inventors: Chunfeng Yuan, Beijing (CN); Jun Xu, Beijing (CN)

(73) Assignee: LENOVO (BEIJING) CO., LTD., Hadian District, Beijing (CN)

( * ) Notice: Subject to any disclaimer, the term of this patent is extended or adjusted under 35 U.S.C. 154(b) by 0 days.

(21) Appl. No.: 14/788,014

(22) Filed: Jun. 30, 2015

(65) Prior Publication Data
US 2016/0215540 A1 Jul. 28, 2016

(30) Foreign Application Priority Data
Jan. 26, 2015 (CN) .......................... 2015 1 0038540

(51) Int. Cl.
*G06F 1/16* (2006.01)
(52) U.S. Cl.
CPC .......... *G06F 1/1616* (2013.01); *G06F 1/1681* (2013.01)
(58) Field of Classification Search
CPC combination set(s) only.
See application file for complete search history.

(56) References Cited

U.S. PATENT DOCUMENTS

| 8,205,305 B2* | 6/2012 | Wang | G06F 1/1681 16/354 |
| 8,474,101 B2* | 7/2013 | Wang | G06F 1/1681 16/354 |
| 8,578,561 B2* | 11/2013 | Chuang | G06F 1/1681 16/354 |
| 9,342,101 B2* | 5/2016 | Hsu | G06F 1/1616 |
| 2005/0050686 A1* | 3/2005 | Kurokawa | G06F 1/1618 16/354 |
| 2009/0070961 A1* | 3/2009 | Chung | E05D 3/122 16/354 |
| 2011/0271486 A1* | 11/2011 | Wang | G06F 1/1681 16/319 |
| 2012/0096678 A1* | 4/2012 | Zhang | G06F 1/1681 16/302 |
| 2013/0139355 A1* | 6/2013 | Lee | H04M 1/022 16/354 |
| 2014/0360296 A1* | 12/2014 | Hsu | G06F 1/1616 74/98 |

(Continued)

*Primary Examiner* — Lisa Lea Edmonds
(74) *Attorney, Agent, or Firm* — Brinks Gilson & Lione; G. Peter Nichols

(57) ABSTRACT

A connector and an electronic device that includes the connector are described. The connector includes a first helical gear for connecting with a first part of an electronic device; a second helical gear for connecting with a second part of the electronic device; and an intermediate helical gear located between and engaged with the first helical gear and the second helical gear, wherein axes of the first helical gear and the second helical gear are parallel to each other, and an axis of the intermediate helical gear is orthogonal to that of the first helical gear and the second helical gear, so that the first helical gear and the second helical gear are rotatable synchronously via a rotation of the intermediate helical gear, wherein the first helical gear and the second helical gear are engaged with the intermediate helical gear via respective line contacts.

12 Claims, 3 Drawing Sheets

(56) References Cited

U.S. PATENT DOCUMENTS

| | | | | |
|---|---|---|---|---|
| 2015/0047152 A1* | 2/2015 | Cheng | ............... | E05D 3/122 16/354 |
| 2015/0159413 A1* | 6/2015 | Chen | ............... | E05D 3/122 16/342 |
| 2015/0267450 A1* | 9/2015 | Chiang | ............... | G06F 1/1681 16/354 |
| 2015/0342068 A1* | 11/2015 | Su | ............... | G06F 1/1681 16/354 |
| 2015/0362958 A1* | 12/2015 | Shang | ............... | G06F 1/1681 361/679.58 |
| 2016/0010374 A1* | 1/2016 | Hsu | ............... | G06F 1/16 74/414 |
| 2016/0011632 A1* | 1/2016 | Hsu | ............... | E05D 3/122 16/354 |
| 2016/0060927 A1* | 3/2016 | Xu | ............... | G06F 1/1681 361/679.55 |
| 2016/0070310 A1* | 3/2016 | Holung | ............... | G06F 1/1681 361/679.09 |

* cited by examiner

CONNECTOR AND AN ELECTRONIC DEVICE HAVING THE SAME

This application claims priority to Chinese Patent Application No. 201510038540.3 filed on Jan. 26, 2015; the entire contents of which are incorporated herein by reference.

BACKGROUND

The present disclosure relates to a connector and an electronic device with the same.

A rotation connector is widely applied in a variety of electronic devices for realizing rotation between two parts of the electronic device. For example, for a laptop, between its monitor (a part having the display screen) and main body (a part having the keyboard) a rotation connector is provided, which enables the free rotation of the monitor relative to the main body to position the monitor at an angle desired by the user.

In order to realize the rotation of a large angle, such as up to 360 degrees, between two parts of the electronic device, recently a rotation connector comprised of three helical gears disposed as unparallel to each other is proposed. However, the engagement between any two of the three helical gears is in a form of point contact. Thus, due to the manufacturing and assembling inaccuracy of the components, possibly the connector may not rotate smoothly and stably enough. What's more, the point contact requires the connector having great strength and wear resistance, which brings a big challenge to the connector.

Therefore, there is a need for providing a novel rotation connector, which, on one hand, can realize rotation of a large angle, and on the other hand, can make further development in smooth rotation, strength and wear resistance. Accordingly, there is also a need for providing an electronic device with such a novel rotation connector.

SUMMARY

In an embodiment of the present disclosure, it is provided a connector comprising: a first helical gear for connecting with a first part of an electronic device; a second helical gear for connecting with a second part of the electronic device; and an intermediate helical gear located between and engaged with the first helical gear and the second helical gear, wherein axes of the first helical gear and the second helical gear are parallel to each other, and an axis of the intermediate helical gear is orthogonal to that of the first helical gear and the second helical gear, so that the first helical gear and the second helical gear are rotatable synchronously via a rotation of the intermediate helical gear, wherein the first helical gear and the second helical gear are engaged with the intermediate helical gear via respective line contacts.

In another embodiment of the present disclosure, it is provided an electronic device comprising the connector according to the above embodiment and first and second parts rotatably connected to the connector.

It should be appreciated that above description is merely for illustrative purposes and are not intended to limit the scope of the disclosure.

DETAILED DESCRIPTION

Figure 1:
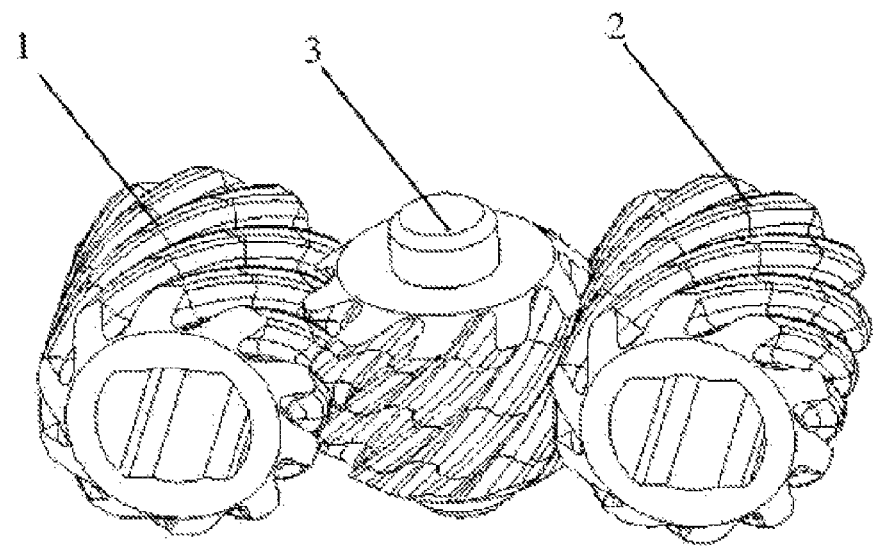
FIG. 1 is a schematic view showing the main components of a rotation connector according to a related art.

Foregoing and other technical solutions, features and advantages of the present disclosure will become apparent from the detailed description hereinafter in conjunction with accompanying drawings. The terms, such as "on", "under", "left", "right", "front", "back", or the like, if used in embodiments hereinafter, are used to indicate directions of drawings. Therefore, direction terms are for illustration purposes and are not intended to limit the present disclosure. Also, same reference numbers indicate same elements.

Various exemplary embodiments of the present disclosure will be described hereinafter referring to the drawings.

Firstly, referring to FIG. 1 which is a schematic view of main components of the rotation connector according to the related art, the rotation connector includes a first helical gear 1, a second helical gear 2, and an intermediate helical gear 3 located between and engaged with the first helical gear 1 and the second helical gear 2. The helical gear 1 and the second helical gear 2 can be connected to two parts of the electronic device needed to be rotated with each other. The axis of the helical gear 3 is substantially perpendicular to those of the first helical gear 1 and the second helical gear 2 in a form like worm-gear. The intermediate helical gear 3 can be rotated freely, i.e. it is not locked, thus, the first helical gear 1 can drive the intermediate helical gear 3 rotating around the second helical gear 2, and thus the relative rotation of the two parts of the electronic device is realized. Compared to a connector comprised of for example two spur gears engaged to each other, the aforementioned rotation connector comprised of three helical gears can rotate by a larger angle.

Figure 2:
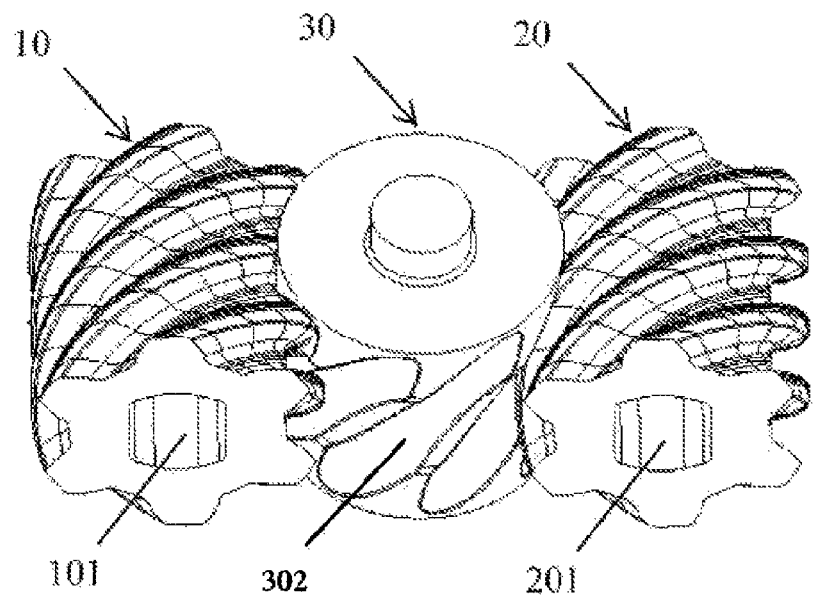
FIG. 2 is a schematic view showing the main components of a rotation connector according to an embodiment of the present disclosure.

Now, referring to FIG. 2 which is a schematic view showing main components of a rotation connector according to an embodiment of the present disclosure, the connector according to this embodiment comprises a first helical gear 10, a second helical gear 20 and an intermediate helical gear 30 located between and engaged with the first helical gear 10 and the second helical gear 20. The three helical gears are arranged in such a way that the axes of the first helical gear 10 and the second helical gear 20 are parallel to each other, and the axis of the intermediate helical gear 30 is substantially orthogonal to that of the first helical gear 10 or the second helical gear 20. When the connector is mounted in an electronic device, the first helical gear 10 is connected to a first part of the electronic device, and the second helical gear 20 is connected to a second part of the electronic device. When the first part of the electronic device is rotated/turned by the user, the first part can make the first helical gear 10 rotate, which makes the intermediate helical gear 30 rotate, in this case, if the second part of the electronic device keeps stationary, then the intermediate helical gear 30 may be rotated around the second helical gear 20 like a planet, and if the second part of the electronic device rotates, then the first helical gear 10 and the second helical gear 20 may be rotated synchronously around the intermediate helical gear 30. Anyway, the difference just lies in how to make the relative movements among the three helical gears. Thus, the relative movement of the first part to the second part of the electronic device is realized with the help of the connector compromised of the aforementioned three helical gears.

The present inventor made a lot of efforts on how to reduce the engagement stress between the gears and improve the rotation smoothness. The present inventor found that it is difficult and cost inefficient through improving the manufacturing and assembling accuracy of the gears. Finally, the inventor conceived to change the engagement/contact form between the gears. Specifically, in the aforementioned embodiment, the inventor designed the intermediate helical gear as a gear with an enveloping surface 302, so that the first helical gear and the second helical gear are engaged with the intermediate helical gear in a form of line contact, respectively. Thus, compared to the connector with engagement in a form of point contact in the prior art of FIG. 1, the connector of the embodiment of the present disclosure has substantial improvement on transmission smoothness and reducing on contact stress and since line contact may increase the engagement area and thus reduce the stress on the teeth of the gear, which has been proved to be true by theoretical analysis, software simulation and experiments made by the inventor.

Figure 3:
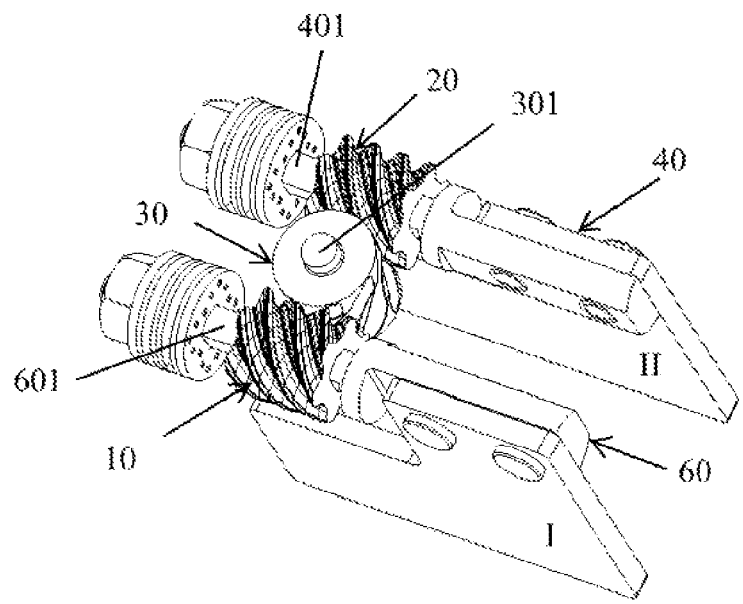
FIGS. 3-5 are schematic views respectively showing connecting details between the rotation connector and the two parts of the electronic device according to an embodiment of the present disclosure, wherein for the clarity, the connecting member for holding the first, intermediate and second helical gears together are not shown in FIG. 3; only one aforementioned connecting member is shown in FIG. 4; and all, i.e. two, aforementioned connecting members are shown in FIG. 5.
Figure 4:
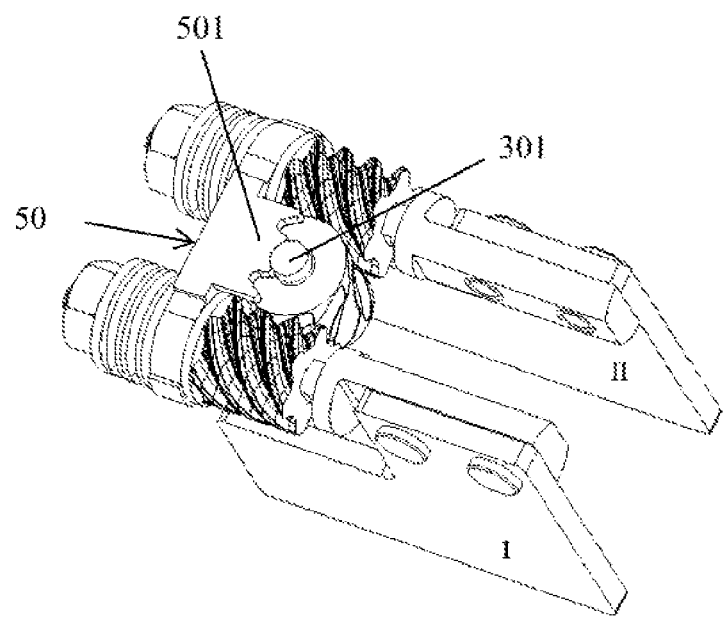
Figure 5:
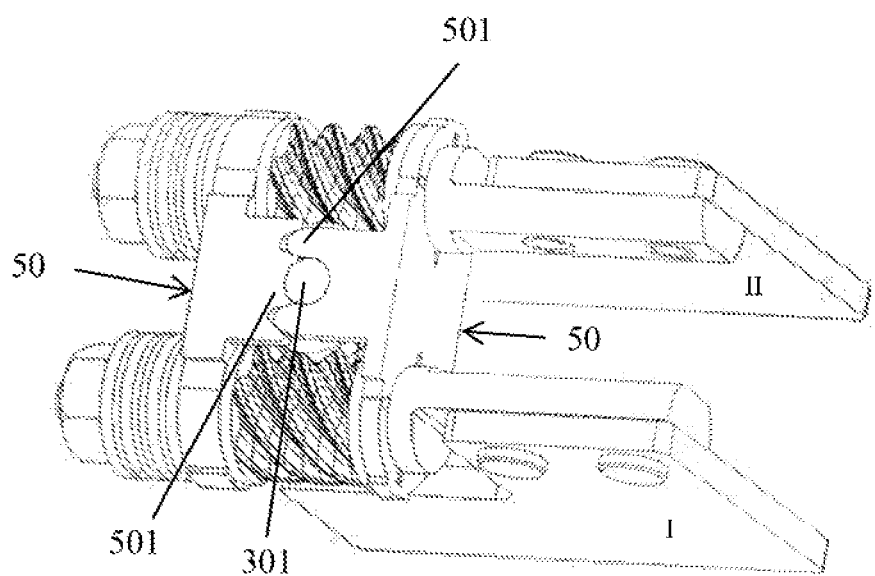

In the following, referring to FIG. 2 and FIGS. 3-5, the connecting details between the rotation connector and the two parts of an electronic device according to the embodiment of the present disclosure is further described, wherein for clarity, the connecting member for holding the first, intermediate and second helical gears together are not shown in FIG. 3; only one aforementioned connecting member is shown in FIG. 4; and all, i.e. two, aforementioned connecting members are shown in FIG. 5. As shown in FIG. 2, the first helical gear 10 has a first non-circular hole 101, and the second helical gear 20 has a second non-circular hole 201. In FIG. 2, the shape of each of the first hole 101 and the second hole 201 is illustrated as comprised of two opposed arcs connected by two parallel lines. Of course, the first hole 101 and the second hole 201 may have any other shapes of non-circle, such as a rectangular shape. Referring to FIG. 3, a part I of the electronic device has a first rod 60 fitted in the first hole 101, and the other part II of the electronic device has a second rod 40 fitted in the second hole 201. The first rod 60 has a part of non-circular shape corresponding to the shape of the first hole 101, thus said part may be closely fitted in the first hole 101 so that the first rod 60 can not rotate freely in the first hole 101. In this way, the first helical gear 10 can be fixed to the part I of the electronic device by form fitting simply and effectively. Similarly, the second rod 40 has a part of non-circular shape corresponding to the shape of the second hole 201, thus said part of the second rod 40 may be closely fitted in the second hole 201 by form fitting. In this way, the second helical gear 20 can be fixed to the part II of the electronic device simply and effectively. Of course, the first and second helical gears can be mounted to the electronic device in other way such as welding, but it is not simple and effective as the form fitting of the present disclosure.

Referring to FIG. 4, the connector according to the embodiment of the present disclosure further comprises a connecting member 50. Together considering the FIGS. 3-5, it can be seen that, the connecting member 50 is fitted as surrounding the components 601, 401 shown in FIG. 3. Specifically, as shown in FIG. 3, in addition to the afore- mentioned non-circular parts for fitting with the first and second helical gears 10, 20, each of the first rod 60 and second rod 40 further comprises a circular part for fitting in each of the two circular holes of the connecting member 50. In this way, the first and second helical gears are connected together through the connecting member 50 to avoid moving away from each other, and the first and second helical gears can be rotated freely with respect to the connecting member, that is to say, the relative movement between the first and second helical gears is not prevented by the connecting member. It is noted that, the term "circular" in the description may mean perfect circular, circular, almost circular or round, depending on the specific situation. That is, the circular parts of the first and second rods 60, 40 for fitting in the connecting member 50 may be not necessarily of a perfect circle shape, as long as they can freely rotate in the holes of the connecting member. Specially, the shape of the circular part for fitting in the connecting member 50, of each of the first and second rods 60, 40 may be comprised of two opposed arcs connected by two parallel lines, in this situation, in operation, the arc portions of the circular parts of the first and second rods 60, 40 contact with the walls of the circular holes of the connecting member 50 and rotate therein, but the line portions of the circular parts of the first and second rods 60, 40 do not contact with the walls of the circular holes of the connecting member 50 and thus do not prevent the free rotation of the rods. Thus, actually, the non-circular parts of the first and second rods 60, 40 for fitting with the first and second helical gears 10, 20, and the circular (almost circular) parts of the first and second rods 60, 40 for fitting with the circular (perfect circular) hole of the connecting member 50, can be manufactured with the same shape and size, thereby facilitating the manufacture and assembly of the components.

Now it is to introduce how to position the intermediate helical gear 30. Referring to FIG. 4, the intermediate helical gear 30 has protruding circular axles 301, and the connecting member 50 has a holding part 501 with a half-circular cavity. Referring to FIG. 5, there are two connecting members 50 in this embodiment, and the two connecting members 50 are combined together by form fitting and together form a circular cavity for receiving the circular axle 301 of the intermediate helical gear 30. Thus, the intermediate helical gear 30 is configured to be arranged between the first and second helical gears 10, 20 and be able to freely rotate in the circular cavity of the connecting member 50. It is noted that, only the holding part 501 on one side of the connecting member 50 is shown in FIG. 5, and it is understood that, there is another same holding part 501 on the other side (bottom side) not shown. Thus, when the two connecting members are assembled together easily through form fitting, the intermediate helical gear 30 is rotatably held by the assembled connecting members. In this way, the first, intermediate and second helical gears are connected together through the connecting members to avoid moving away from each other. However, it should be understood that, other ways to rotatably position the intermediate helical gear are also possible, and the present disclosure is not limited to the embodiment as shown in the figures.

The gears of the connector according to the embodiment of the present disclosure may be manufactured by molding, such as by molding hard plastic, owing to the reduced requirement to material strength brought by line contact. Of course, the connector can be manufactured by metal material.

The aforementioned two parts 1, 11 of the electronic device connected with the connector according to the embodiment of the present disclosure can be any two parts of the electronic device needed to be able to relatively rotate. For example, for a laptop, the part 1 may be the monitor (i.e. the part having display screen), the part 11 can be the main body (i.e. the part having keyboard); and for a pad computer with a supporting device for supporting it on a supporting platform in a desired angle, the part 1 may be a main body of the pad computer, and the part 11 may be the supporting device, that is, the connector according to the embodiment of the present disclosure is connected between the supporting device and the back side of main body of the pad computer. In the embodiment of the present disclosure, the two parts of the electronic device connected by the aforementioned connector may be turned with each other 0-360 degree.

Accordingly, the present disclosure also provides an electronic device, such as a laptop or a pad computer, with the aforementioned connector. In this case, two connectors may be mounted at both ends of the laptop or pad computer.

Finally, it should be noted that, although in the various embodiments, the present disclosure has been described in the specification and are illustrated in the accompanying drawings, those skilled in the art will appreciate that the above-described embodiments are merely embodiments, and some technical features in the embodiments may be not necessary for solving a specific technical problem, which can be removed or omitted without affecting the resolution to the technical problems; also, features, elements and/or functions of one embodiment can be combined, composited, cooperated with features, elements and/or functions of one or more other embodiments, unless the combination, composition or cooperation can not be implemented.

The invention claimed is:

1. A connector comprising:
    a first helical gear for connecting with a first part of an electronic device;
    a second helical gear for connecting with a second part of the electronic device; and
    an intermediate helical gear having an enveloping surface and being located between and engaged with the first helical gear and the second helical gear,
    wherein axes of the first helical gear and the second helical gear are parallel to each other, and an axis of the intermediate helical gear is orthogonal to that of the first helical gear, the second helical gear, and to a connecting line between the axis of the first helical gear and the second helical gear, the connecting line being orthogonal to the first helical gear and the second helical gear so that the first helical gear and the second helical gear are rotatable synchronously via a rotation of the intermediate helical gear,
    wherein the first helical gear and the second helical gear are engaged with the intermediate helical gear via respective line contacts.

2. The connector according to claim 1, wherein the first helical gear has a first non-circular hole along the axis of the first helical gear for receiving the first part of the electronic device.

3. The connector according to claim 2, wherein the second helical gear has a second non-circular hole along the axis of the second helical gear for receiving the second part of the electronic device.

4. The connector according to claim 3, further comprising a connecting member having two circular holes for receiving the first and second parts of the electronic device respectively.

5. The connector according to claim 4, wherein the intermediate helical gear has a protruding circular axle and the connecting member has a holding part with a cavity, so that the circular axle of the intermediate helical gear is fitted in the cavity of the holding part of the connecting member to hold the first, second, and intermediate helical gears together.

6. The connector according to claim 5, wherein the connector has a plurality of the connecting members, the holding parts of which abut against each other to form the cavity for receiving the circular axel of the intermediate helical gear.

7. The connector according to claim 1, wherein the first, second and intermediate helical gears are configured to enable a relative rotation of 360 degrees between the first and second parts of the electronic device.

8. The connector according to claim 1, wherein the first, intermediate and second helical gears are metallic.

9. The connector according to claim 1, wherein the first, intermediate and second helical gears are made of plastic.

10. An electronic device, comprising:
    the connector according to claim 1; and
    first and second parts rotatably connected to the connector.

11. The electronic device according to claim 10, comprising a plurality of the connectors at opposite ends of the electronic device.

12. The electronic device according to claim 10, wherein the electronic device is a laptop, the first part is a monitor of the laptop, and the second part is a main body of the laptop.

* * * * *